US009366324B2

(12) United States Patent
Huang et al.

(10) Patent No.: US 9,366,324 B2
(45) Date of Patent: Jun. 14, 2016

(54) ACTUATION SYSTEM

(71) Applicant: NATIONAL TAIWAN UNIVERSITY, Taipei (TW)

(72) Inventors: Han-Pang Huang, Taipei (TW); Ren-Jeng Wang, Taipei (TW)

(73) Assignee: NATIONAL TAIWAN UNIVERSITY, Taipei (TW)

(*) Notice: Subject to any disclaimer, the term of this patent is extended or adjusted under 35 U.S.C. 154(b) by 434 days.

(21) Appl. No.: 13/908,243

(22) Filed: Jun. 3, 2013

(65) Prior Publication Data

US 2013/0319143 A1    Dec. 5, 2013

(30) Foreign Application Priority Data

Jun. 4, 2012    (TW) .............................. 101120028 A

(51) Int. Cl.
| | |
|---|---|
| *F16H 37/06* | (2006.01) |
| *F16H 1/16* | (2006.01) |
| *F16H 19/02* | (2006.01) |
| *F16H 1/22* | (2006.01) |
| *F16H 25/24* | (2006.01) |

(52) U.S. Cl.
CPC ................ *F16H 19/02* (2013.01); *F16H 1/225* (2013.01); *F16H 37/065* (2013.01); *F16H 25/2409* (2013.01); *Y10T 74/18792* (2015.01)

(58) Field of Classification Search
CPC ......... F16H 1/16; F16H 37/065; F16H 1/225; F16H 25/2409
USPC .................. 74/665 A, 425, 724, 89.14, 89.29
See application file for complete search history.

(56) References Cited

U.S. PATENT DOCUMENTS

| | | | | |
|---|---|---|---|---|
| 1,490,671 A * | 4/1924 | Lindstrom | .......... | B66B 11/0446 254/340 |
| 3,188,044 A * | 6/1965 | Conrad | ................ | B60N 2/0232 248/394 |
| 3,523,599 A * | 8/1970 | Denkowski | ............... | B66F 3/18 192/150 |
| 4,987,791 A * | 1/1991 | Nakahashi | ................ | B60S 1/08 74/425 |
| 5,392,666 A * | 2/1995 | Lin | ......................... | F16H 55/24 74/402 |
| 5,480,198 A * | 1/1996 | Wydler | ............... | E05B 47/0012 292/142 |
| 7,555,970 B2 * | 7/2009 | Hawkes | .................. | F16H 55/24 74/665 A |
| 2011/0041632 A1* | 2/2011 | Baker | ..................... | B64C 13/28 74/89.23 |
| 2012/0073890 A1* | 3/2012 | Bindl | ..................... | E02F 9/202 180/69.6 |

* cited by examiner

*Primary Examiner* — William Kelleher
*Assistant Examiner* — Emily Cheng
(74) *Attorney, Agent, or Firm* — Muncy, Geissler, Olds & Lowe, P.C.

(57) ABSTRACT

Disclosed is an actuation system for adjusting the rigidity of elastic elements by using two sets of transmission modules together with a link gear and two sets of nonlinear elastic elements. The actuation system actuates an external arm by controlling the two sets of transmission modules to rotate in different directions and adjusts the rigidity of the elastic elements by controlling the two sets of transmission modules to rotate in the same direction, so as to achieve the effects of reducing the number of actuation modules used, minimizing the volume of the actuation system, and reducing production cost.

10 Claims, 13 Drawing Sheets

ACTUATION SYSTEM

This application claims the benefit of Taiwan Application Patent No. 101120028, filed on Jun. 4, 2012, in the Taiwan Intellectual Property Office, the disclosure of which is incorporated herein in its entirety by reference.

FIELD OF THE INVENTION

The present invention relates to an actuation system, and more particularly to the actuation system that uses two transmission modules in conjunction with a nonlinear elastic element to achieve the effects of improving the output kinetic energy and adjusting the rigidity of the elastic element.

BACKGROUND OF THE INVENTION

Mechanical arm is an automated machine with the abilities including the planning ability, motion ability and coordination ability similar to those of human beings and living organisms, and thus the mechanical arm is a highly elastic automated machine. At present, the technology of mechanical arms is developed rapidly and applied extensively in different areas, and the structure of the mechanical arms is experiencing a big change. Basically, the mechanical arm can be divided into two main types, respectively: an industrial mechanical arm used in manufacturing environments, and a mechanical arm used in non-manufacturing environments. The so-called industrial mechanical arm used in the manufacturing environments refers to a multi-joint mechanical arm or a multiple degree-of-freedom mechanical arm. The mechanical arm used in the non-manufacturing environments refers to any mechanical arm other than the industrial mechanical arm and it includes a service mechanical arm, an underwater mechanical arm, an entertaining mechanical arm, a military mechanical arm, an agricultural mechanical arm, a cleaning mechanical arm, etc.

Most of the present simulating robotic arms come with an elasticity adjusting function and a drive controlling function. The robotic arms can use the elasticity adjusting function to adjust the elastic resilience of the mechanical arm for its interactions with human beings and improve the user's safety during the use of the mechanical arm. When it is necessary to use the mechanical arm for a positioning operation, the elastic resilience can be adjusted again to achieve a precise positioning operation of the mechanical arm. However, most of the present simulating mechanical arms adjust the elasticity and drive the operation of the arms by using a plurality of actuation units. When the arm is driven to move, some of the actuation units are used, but the remaining actuation units are idle, thus failing to utilize the actuation units effectively and causing unnecessary waste of cost.

In view of the aforementioned problems of the conventional actuation system, the inventor of the present invention developed an actuation system that combines two transmission modules with two nonlinear elastic elements to overcome the problems of the prior art and improve the industrial application.

SUMMARY OF THE INVENTION

It is a primary objective of the present invention to provide an actuation system to overcome the problems of the conventional actuation system that fails to utilize an actuation unit effectively.

To achieve the aforementioned objective, the present invention provides an actuation system, comprising: a first transmission module, a second transmission module and a linking module. The first transmission module comprises a first transmission shaft, a first transmission part, a first actuation part and a first elastic element. The first transmission shaft comes with a rod structure. The first transmission part is sheathed on the first transmission shaft, and an external surface of the first transmission part has a threaded structure. The first actuation part is sheathed on a first adjusting element, and the first adjusting element is sheathed on the first transmission shaft. The first elastic element is sheathed on the first transmission shaft and disposed between the first transmission part and the first actuation part. The second transmission module comprises a second transmission shaft, a second transmission part, a second actuation part and a second elastic element. The second transmission shaft comes with a rod structure. The second transmission part is sheathed on the second transmission shaft, and an external surface of the second transmission part has a threaded structure. The second actuation part is sheathed on a second adjusting element, and the second adjusting element is sheathed on the second transmission shaft. The second elastic element is sheathed on the second transmission shaft and disposed between the second transmission part and the second actuation part. The linking module comprises a linking element and an external arm. The linking element comes with a disc structure. The linking element is mounted onto a frame and disposed between the first transmission part and the second transmission part, and an external periphery of the linking element has a serrated structure corresponding to the threaded structure, and the serrated structure is embedded with the threaded structures of the first transmission part and the second transmission part. The external arm is sheathed on a linking shaft for coupling the linking element.

Preferably, the first actuation part is driven to rotate in a first direction while the second actuation part is being driven to rotate in a second direction to drive the first transmission shaft and the second transmission shaft to rotate in the first direction and the second direction respectively, so that the first transmission part and the second transmission part are rotated in the first direction and the second direction respectively, and the linking element is rotated to drive and rotate the external arm synchronously.

Preferably, the first actuation part and the second actuation part are driven to rotate in a first direction or a second direction simultaneously to drive the first transmission shaft and the second transmission shaft to rotate in the first direction or the second direction, so that the first transmission part and the second transmission part are rotated in the first direction or the second direction simultaneously, and the linking element is not rotated.

Preferably, when the first actuation part and the second actuation part are driven to rotate in the first direction or the second direction simultaneously, so that the linking element, the first transmission part, the second transmission part, the first transmission shaft and the second transmission shaft are not rotated, and when the first actuation part and the second actuation part are driven to rotate continuously, the first actuation part and the second actuation part are displaced in an axial direction through the first adjusting element and the second adjusting element to compress or stretch the first elastic element and the second elastic element respectively.

Preferably, the first elastic element and the second elastic element are conical springs.

Preferably, when the external arm is pushed by an external force, the linking element is linked to rotate, so that the first transmission part and the second transmission part are displaced in an axial direction along the first transmission shaft and the second transmission shaft respectively.

To achieve the aforementioned objective, the present invention provides an actuation system, comprising: a transmission module and an actuation module. The transmission module comprises a first transmission shaft, a first transmission part, a first actuation part, a first elastic element, a second transmission shaft, a second transmission part, a second actuation part, a second elastic element and a linking element. The first transmission shaft comes with a rod structure. The first transmission part is sheathed on the first transmission shaft, and an external surface of the first transmission part has a threaded structure. The first actuation part is sheathed on a first adjusting element, and the first adjusting element is sheathed on the first transmission shaft. The first elastic element is sheathed on the first transmission shaft and disposed between the first transmission part and the first actuation part. The second transmission shaft comes with a rod structure. The second transmission part is sheathed on the second transmission shaft, and an external surface of the second transmission part has a threaded structure. The second actuation part is sheathed on a second adjusting element, and the second adjusting element is sheathed on the second transmission shaft. The second elastic element is sheathed on the second transmission shaft and disposed between the second transmission part and the second actuation part. The linking element is a disc structure mounted onto a frame, coupled to an external arm, and disposed between the first transmission part and the second transmission part, and an external periphery of the linking element is embedded with the threaded structure. The actuation module comprises a first actuation unit and a second actuation unit. The first actuation unit is coupled to a first actuation gear set, and the first actuation gear set is embedded with the first actuation part. The second actuation unit is coupled to a second actuation gear set, and the second actuation gear set is embedded with the second actuation part.

Preferably, the first actuation part is driven to rotate in a first direction or a second direction, and the second actuation part is driven to rotate in the second direction or the first direction to drive the first transmission shaft and the second transmission shaft to rotate in the first direction and the second direction respectively, so that the first transmission part and the second transmission part are rotated in the first direction or the second direction respectively, and the linking element is rotated to drive the external arm to rotate synchronously.

Preferably, the first actuation part and the second actuation part are driven to rotate in a first direction or a second direction simultaneously to drive the first transmission shaft and the second transmission shaft to rotate in the first direction or the second direction, so that the first transmission part and the second transmission part are rotated in the first direction or the second direction simultaneously, and the linking element is not rotated.

Preferably, when the first actuation part and the second actuation part are driven to rotate in the first direction or the second direction, so that the linking element, the first transmission part, the second transmission part, the first transmission shaft and the second transmission shaft are not rotated, and when the first actuation part and the second actuation part are driven to rotate continuously, the first actuation part and the second actuation part are displaced in an axial direction through the first adjusting element and the second adjusting element to compress or stretch the first elastic element and the second elastic element respectively.

Preferably, the first elastic element and the second elastic element are conical springs.

Preferably, when the external arm is pushed by an external force, the linking element is linked to rotate, so that the first transmission part and the second transmission part are displaced in an axial direction along the first transmission shaft and the second transmission shaft respectively.

In summation, the actuation system of the present invention has one or more of the following advantages:

(1) In this actuation system, two sets of transmission modules are combined with two sets of nonlinear elastic elements to achieve the effect of adjusting the rigidity of the elastic element actively. When the system has a high rigidity, the system can provide a better positioning control; and when the system has a low rigidity, the system provides a better elasticity between the input mechanism and the output mechanism of the system. Therefore, this actuation system allows users to achieve better operation effects.

(2) This actuation system can adjust the rigidity of the elastic elements effectively, so that the actuation system can be applied in simulating mechanical equipments. The elasticity of each elastic element of the actuation system allows external forces to be applied onto the actuation system directly during the motion of the output shaft, so as to achieve a man-machine interaction effect safely.

(3) This actuation system drives the two actuation parts and rotates the output shafts in different directions simultaneously to obtain a greater output torque.

DESCRIPTION OF THE PREFERRED EMBODIMENTS

The technical characteristics, contents, advantages and effects of the present invention will be apparent with the detailed description of a preferred embodiment accompanied with related drawings as follows. The drawings are provided for the illustration, and same numerals are used to represent respective elements in the preferred embodiments. It is intended that the embodiments and drawings disclosed herein are to be considered illustrative rather than restrictive.

Figure 1:
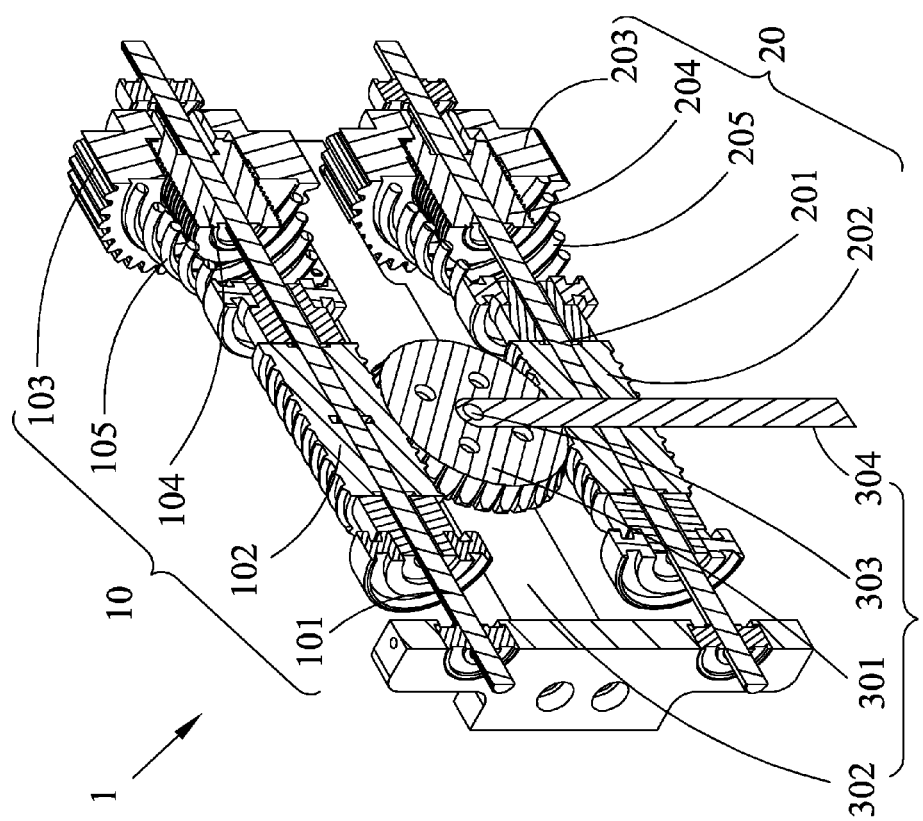
FIG. 1 is a first schematic view of an actuation system of a first preferred embodiment of the present invention.
Figure 2:
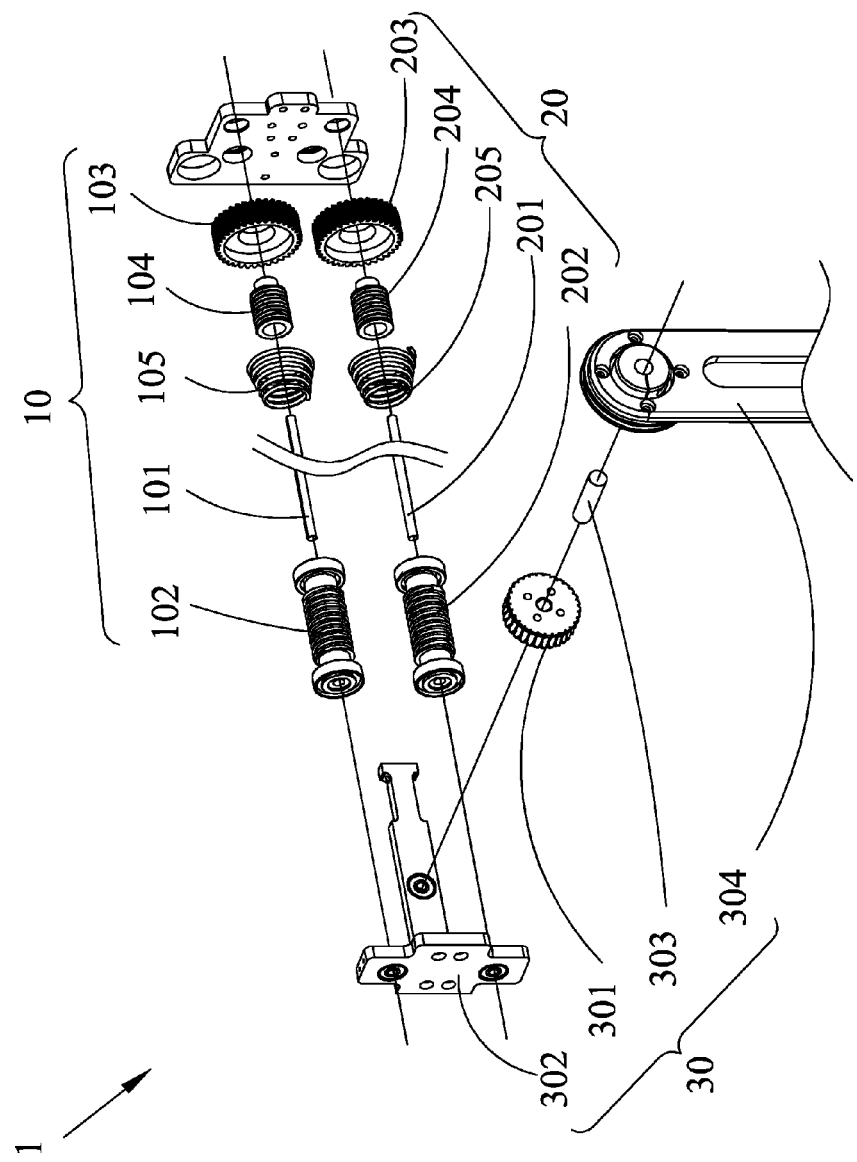
FIG. 2 is a second schematic view of an actuation system of the first preferred embodiment of the present invention.
Figure 3:
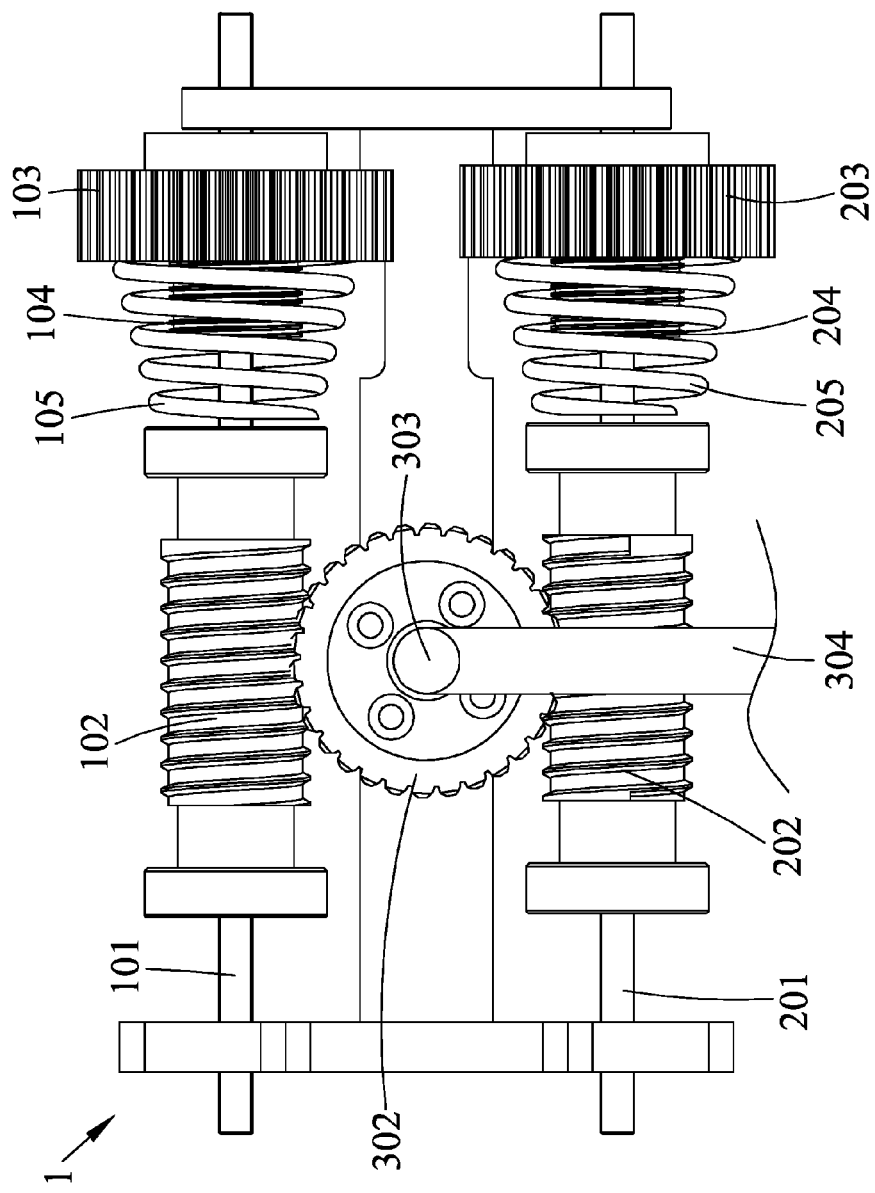
FIG. 3 is a third schematic view of an actuation system of the first preferred embodiment of the present invention.

With reference to FIGS. 1 to 3 for the first to third schematic views of an actuation system of the first preferred embodiment of the present invention respectively, the actuation system 1 comprises a first transmission module 10, a second transmission module 20 and a linking module 30. The first transmission module 10 comprises a first transmission shaft 101, a first transmission part 102, a first actuation part 103, a first adjusting element 104, and a first elastic element 105. The second transmission module 20 comprises a second transmission shaft 201, a second transmission part 202, a second actuation part 203, a second adjusting element 204 and a second elastic element 205. The linking module 30 comprises a linking element 301, a frame 302, a linking shaft 303 and an external arm 304. The first transmission shaft 101 comes with a rod structure. The first transmission part 102 is sheathed on the first transmission shaft 101, and an external surface of the first transmission part 102 has a threaded structure. The first actuation part 103 is sheathed on a first adjusting element 104, and the first adjusting element 104 is sheathed on the first transmission shaft 101. The first elastic element 105 is sheathed on the first transmission shaft 101 and disposed between the first transmission part 102 and the first actuation part 103. The second transmission shaft 201 comes with a rod structure. The second transmission part 202 is sheathed on the second transmission shaft 201, and an external surface of the second transmission part 202 has a threaded structure. The second actuation part 203 is sheathed on a second adjusting element 204, and the second adjusting element 204 is sheathed on the second transmission shaft 201. The second elastic element 205 is sheathed on the second transmission shaft 201 and disposed between the second transmission part 202 and the second actuation part 203. The linking module 30 comprises a linking element 301, a frame 302, a linking shaft 303 and an external arm 304. The linking element 301 is mounted onto the frame 302 and disposed between the first transmission part 102 and the second transmission part 202, and an external periphery of linking element 301 has a serrated structure corresponding to the threaded structure, and the serrated structure is embedded with the threaded structures of the first transmission part 102 and the second transmission part 202. Wherein, the first transmission part 102 and the second transmission part 202 are ball worm gears; the first actuation part 103 and the second actuation part 203 are worm gears; and the linking element 301 is an umbrella gear. The external arm 304 is sheathed on the linking shaft 303 and coupled to the linking element 301. The first elastic element 105 and the second elastic element 205 are conical springs (or nonlinear springs).

In short, the first transmission module 10 and the second transmission module 20 are disposed on both sides of the frame 302 respectively, and the linking module 30 is disposed between the first transmission module 10 and the second transmission module 20, and the external periphery of the first transmission part 102 or the second transmission part 202 has a threaded structure each, and the linking element 301 has a serrated structure corresponding to the threaded structure, and the serrated structure is embedded with the threaded structure.

Figure 4:
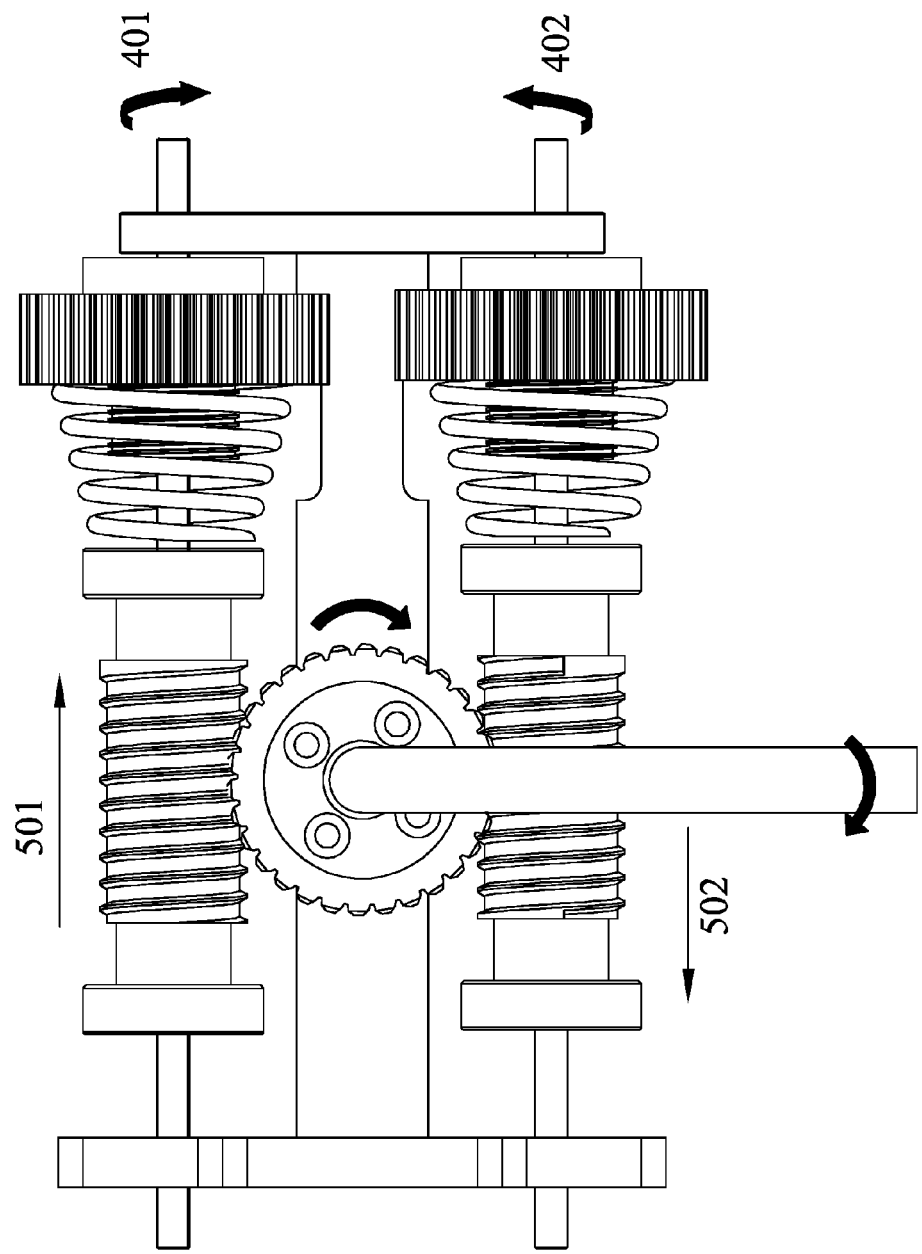
FIG. 4 is a fourth schematic view of an actuation system of the first preferred embodiment of the present invention.
Figure 5:
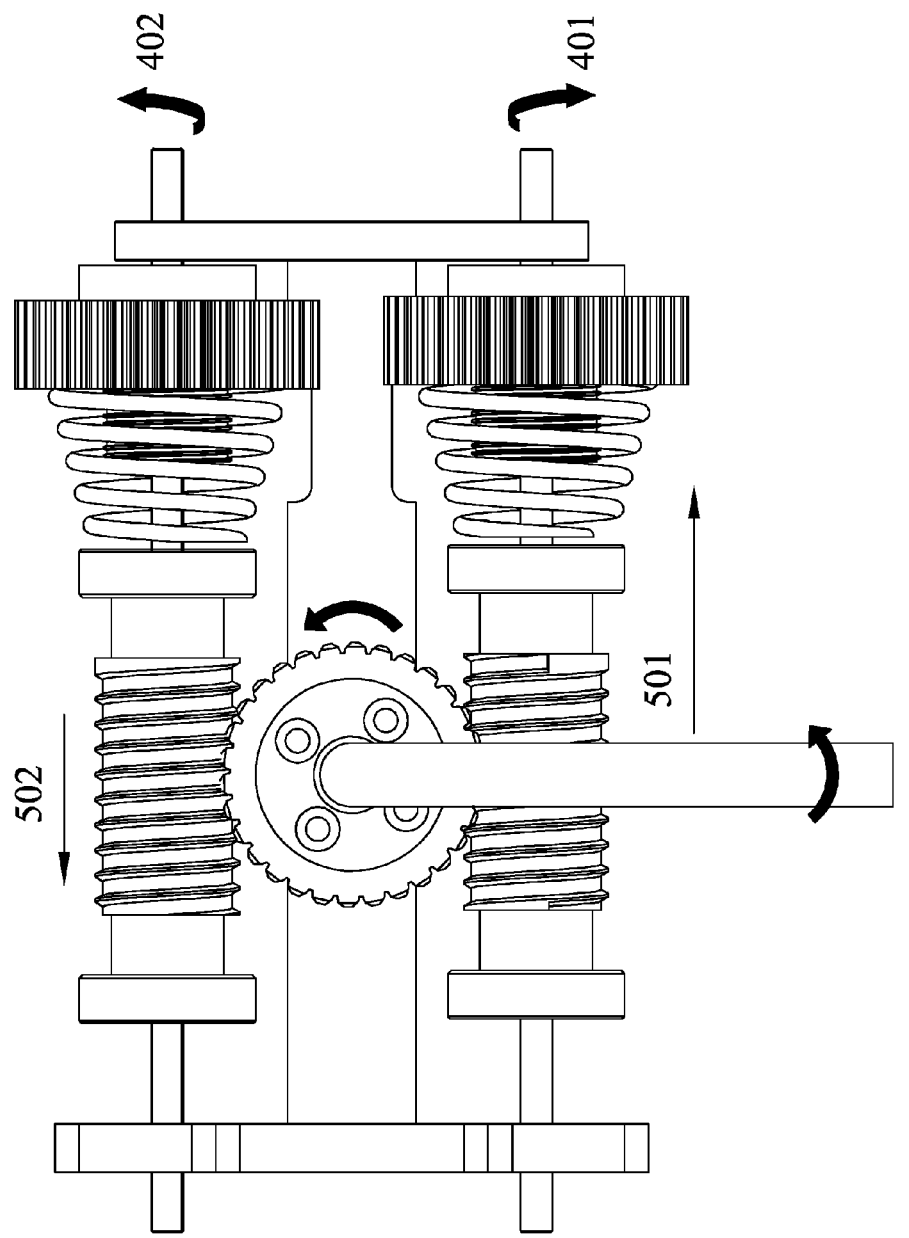
FIG. 5 is a fifth schematic view of an actuation system of the first preferred embodiment of the present invention.

With reference to FIGS. 4 and 5 for the fourth and fifth schematic views of an actuation system of the first preferred embodiment of the present invention respectively, when the first actuation part 103 is driven to rotate in a first direction 401, while the second actuation part 203 is being driven to rotate in a second direction 402, the first transmission shaft 101 is linked to rotate in the first direction 401, and the second transmission shaft 201 is linked to rotate in the second direction 402. In addition, the linking element 301 is embedded with the threaded structures of the first transmission part 102 and the second transmission part 202 by the serrated structure, so that when the first transmission part 102 rotates in the first direction 401, the linking element 301 is linked to rotate. Since the linking element 301 is fixed to the frame 302, the first transmission part 102 is displaced in a first axial direction 501 along the first transmission shaft 101. When the second transmission part 202 rotates in the second direction 402, the linking element 301 is linked to rotate, so that the second transmission part 202 is displaced in a second axial direction 502 along the second transmission shaft 201. When the linking element 301 is driven to rotate, the linking shaft 303 is linked and rotated with the external arm 304.

Similarly, when the first actuation part 103 is driven to rotate in the second direction 402, and the second actuation part 203 is driven to rotate in the first direction 401, the first transmission part 102 and the second transmission part 202 are linked to rotate in the second direction 402 and the first direction 401 respectively and interacted with the linking element 301, so that the first transmission part 102 is displaced in the second axial direction 502, and the second transmission part 202 is displaced in the first axial direction 501.

In short, when the first actuation part 103 and the second actuation part 203 are driven to rotate in different directions, the first transmission part 102 and the second transmission part 202 are interacted with the linking element 301 to rotate in different directions and displace in an axial direction, so that the external arm 304 is driven to rotate.

It is noteworthy that the first transmission part 102 and the second transmission part 202 can be sheathed on a spline structure, and the first transmission shaft 101 and the second transmission shaft 201 are spline shafts. In other words, the first transmission part 102 and the second transmission part 202 can slide on the first transmission shaft 101 and the second transmission shaft 201 respectively (for the displacement in the axial direction). When the first transmission shaft 101 and the second transmission shaft 201 are driven to rotate, the first transmission part 102 and the second transmission part 202 are also driven to rotate.

Figure 6:
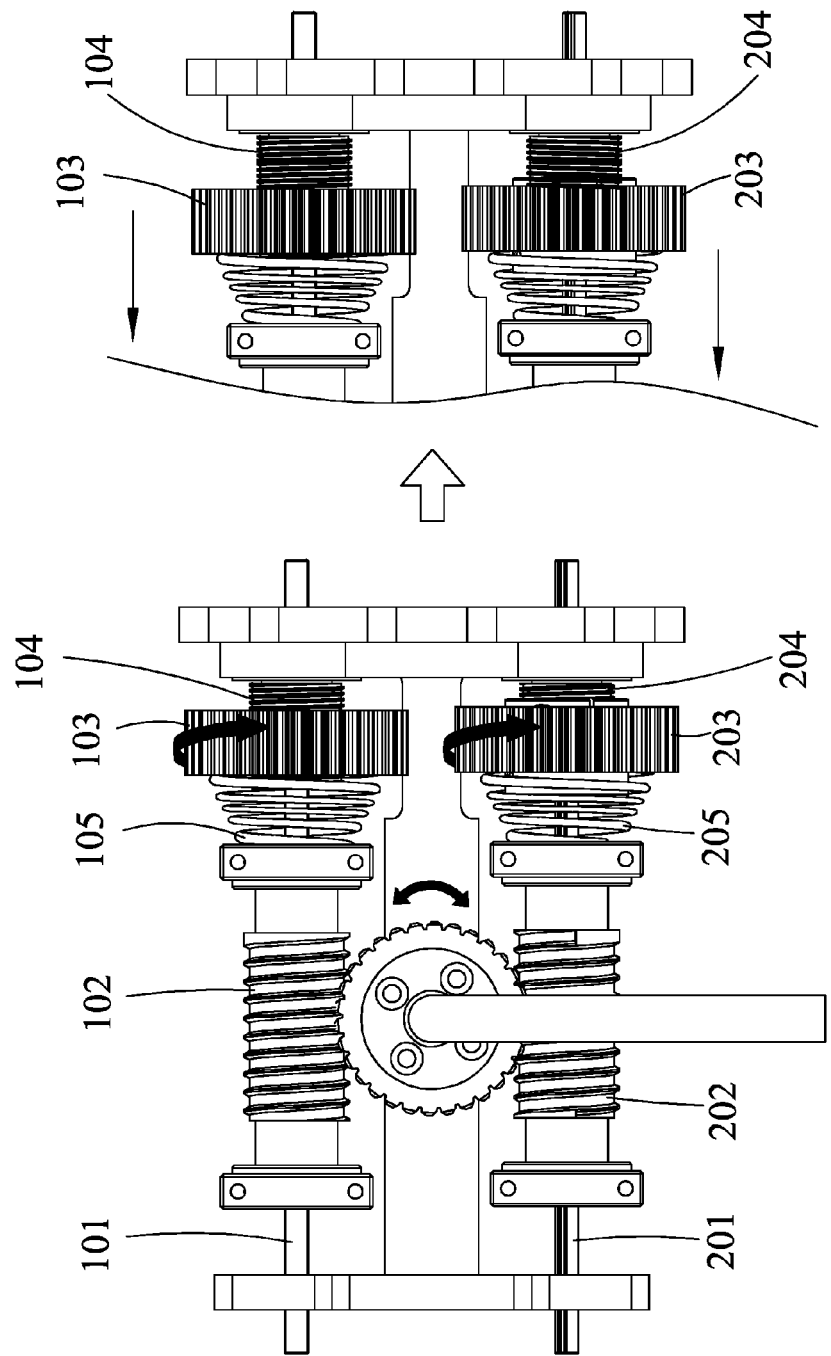
FIG. 6 is a sixth schematic view of an actuation system of the sixth preferred embodiment of the present invention.
Figure 7:
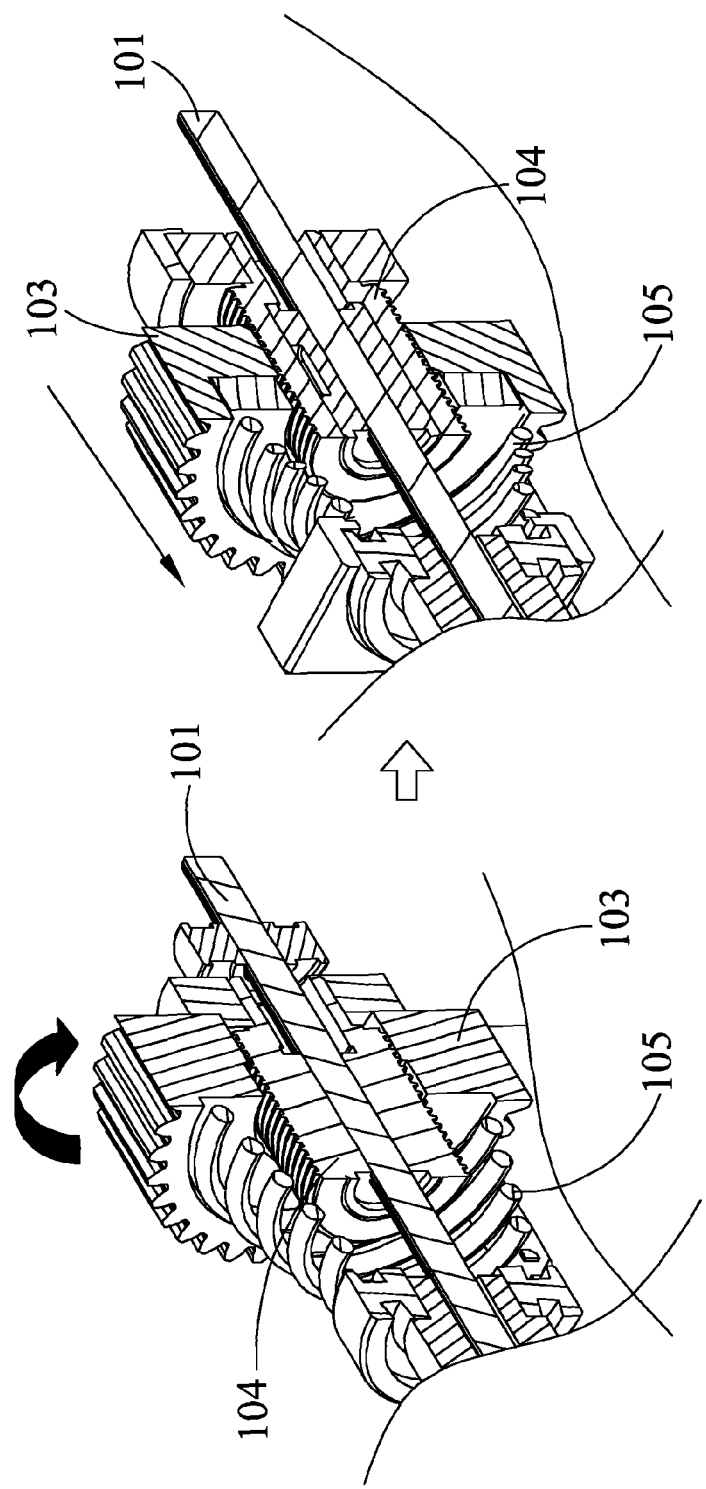
FIG. 7 is a seventh schematic view of an actuation system of the first preferred embodiment of the present invention.

With reference to FIGS. 6 and 7 for the sixth and seventh schematic views of an actuation system of the first preferred embodiment of the present invention respectively, the relation of components of the actuation system 1 is the same as that described above, and thus will not be repeated. It is noteworthy that when the first actuation part 103 and the second actuation part 203 are driven to rotate in the first direction 401 (or the second direction 402) simultaneously, the first transmission part 102 and the second transmission part 202 are linked synchronously to rotate in the first direction 401 (or the second direction 402). Since the linking element 301 is fixed to the frame 302, therefore the first transmission part 102, the second transmission part 202 and the linking element 301 are latched with one another and cannot be rotated. As a result, the first transmission shaft 101 and the second transmission shaft 201 cannot be rotated. Now, if the first actuation part 103 and the second actuation part 203 are driven continuously, then the first actuation part 103 and the second actuation part 203 will interact with the first adjusting element 104 and the second adjusting element 204 respectively, so that the first actuation part 103 and the second actuation part 203 are displaced in the second axial direction 502 (or the first axial direction 501) along the first adjusting element 104 and the second adjusting element 204 respectively.

Further, when the first actuation part 103 and the second actuation part 203 are driven to rotate in different directions (such as both rotating in the first direction 401 or both rotating in the second direction 402), the first transmission part 102 rotates the linking element 301 clockwise (or counterclockwise), and the second transmission part 202 rotates the linking element 301 counterclockwise (or clockwise), so that the linking element 301 interacts with the first transmission part 102 and the second transmission part 202, and the first transmission shaft 101 and the second transmission shaft 201 cannot be rotated. On the other hand, the first adjusting element 104 and the second adjusting element 204 cannot be rotated. Wherein, the external peripheries of the first adjusting element 104 and the second adjusting element 204 have a threaded structure each, so that internal walls of the first actuation part 103 and the second actuation part 203 have corresponding threaded structures, and the first actuation part 103 and the second actuation part 203 can be displaced along the first adjusting element 104 and the second adjusting element 204 by the threaded structures. When the first actuation part 103 and the second actuation part 203 are driven to rotate in the first direction 401 (or the second direction 402) and the first actuation part 103 and the second actuation part 203 are driven to rotate continuously, the first actuation part 103 and the second actuation part 203 are displaced in the first axial direction 501 (or the second axial direction 502) respectively to push or stretch the first elastic element 105 and the second elastic element 205 to adjust the rigidity of the first elastic element 105 and the second elastic element 205. In practical applications, the first adjusting element 104 and the second adjusting element 204 can be ball bearings.

In short, when the first actuation part 103 and the second actuation part 203 are driven to rotate in different directions, the first transmission part 102, the linking element 301 and the second transmission part 202 are latched with one another, so that the first elastic element 105 and the second elastic element 205 can be compressed or stretched to adjust the rigidity of the first elastic element 105 and the second elastic element 205.

Figure 8:
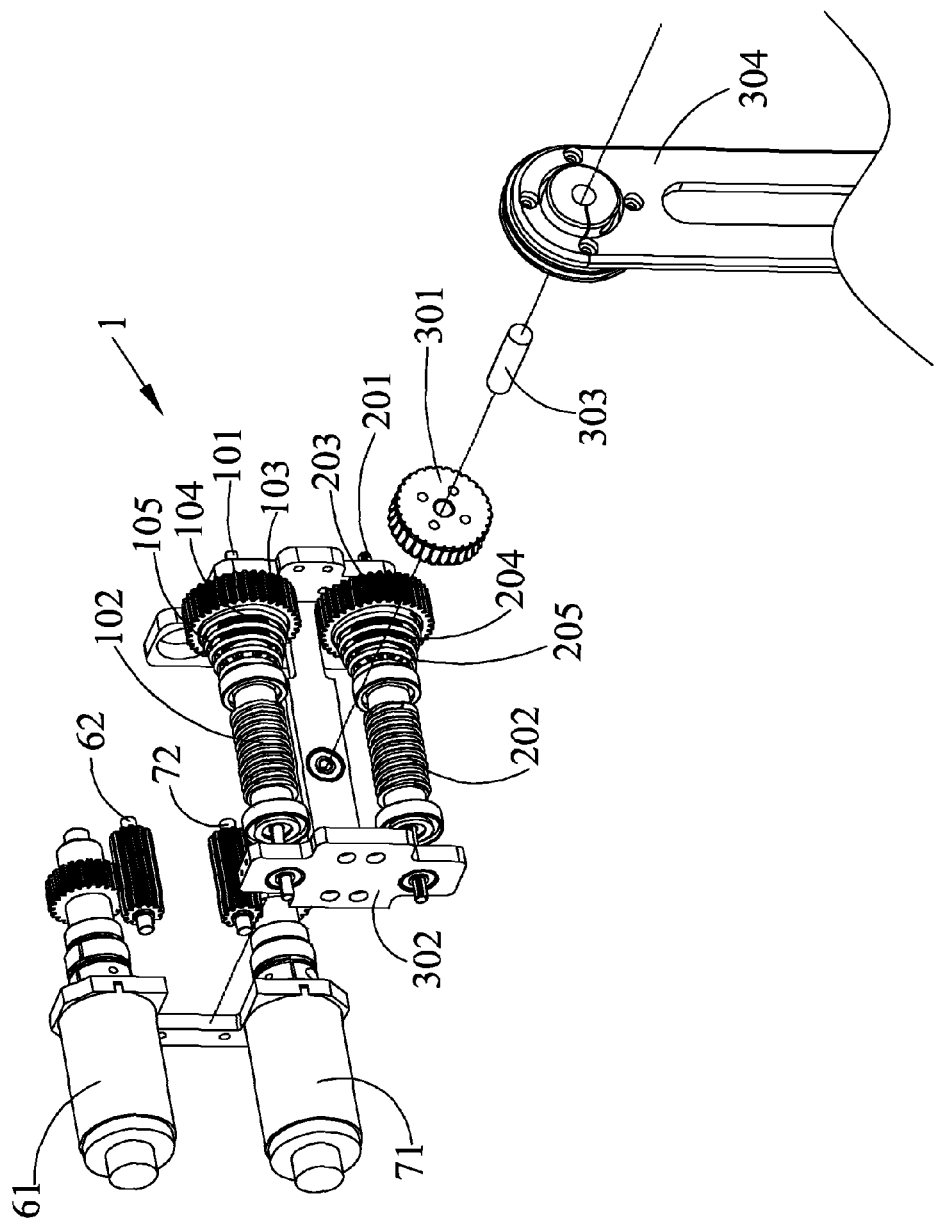
FIG. 8 is a first schematic view of an actuation system of a second preferred embodiment of the present invention.
Figure 9:
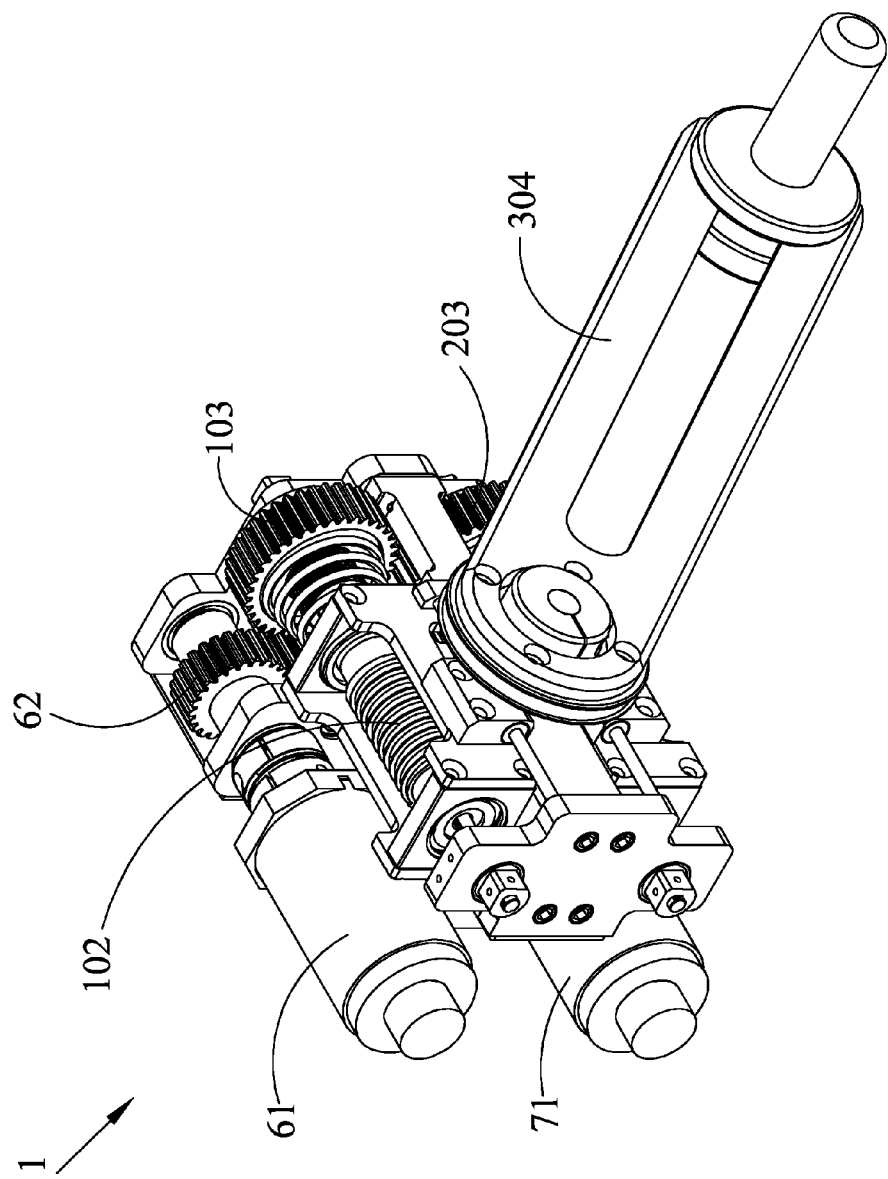
FIG. 9 is a second schematic view of an actuation system of the second preferred embodiment of the present invention.

With reference to FIGS. 8 and 9 for the first and second schematic views of an actuation system of the second preferred embodiment of the present invention respectively, the actuation system 1 comprises a transmission module and an actuation module. The transmission module 40 comprises a first transmission shaft 101, a first transmission part 102, a first actuation part 103, a first adjusting element 104, a first elastic element 105, a second transmission shaft 201, a second transmission part 202, a second actuation part 203, a second adjusting element 204, a second elastic element 205, a linking element 301, a frame 302, a linking shaft 303 and an external arm 304. The actuation module comprises a first actuation unit 61, a first actuation gear set 62, a second actuation unit 71 and a second actuation gear set 72. The first actuation unit 61 is coupled to the first actuation gear set 62, and the first actuation gear set 62 is embedded with the first actuation part 103. The second actuation unit 71 is coupled to the second actuation gear set 72, and the second actuation gear set 72 is embedded with the second actuation part 203. Wherein, the first actuation gear set 62 and the second actuation gear set 72 are formed by a plurality of gears.

When the first actuation unit 61 drives the first actuation gear set 62 to operate, the first actuation part 103 is linked to rotate, so that the first transmission shaft 101 and the first transmission part 102 are rotated, and the linking element 301 is rotated. Similarly, the second actuation unit 71 drives the second actuation part 203, so that the linking element 301 can be rotated by the second transmission part 202, and the operation of the external arm 304 can be controlled or the rigidity of the first elastic element 105 or the second elastic element 205 can be adjusted.

Figure 10:
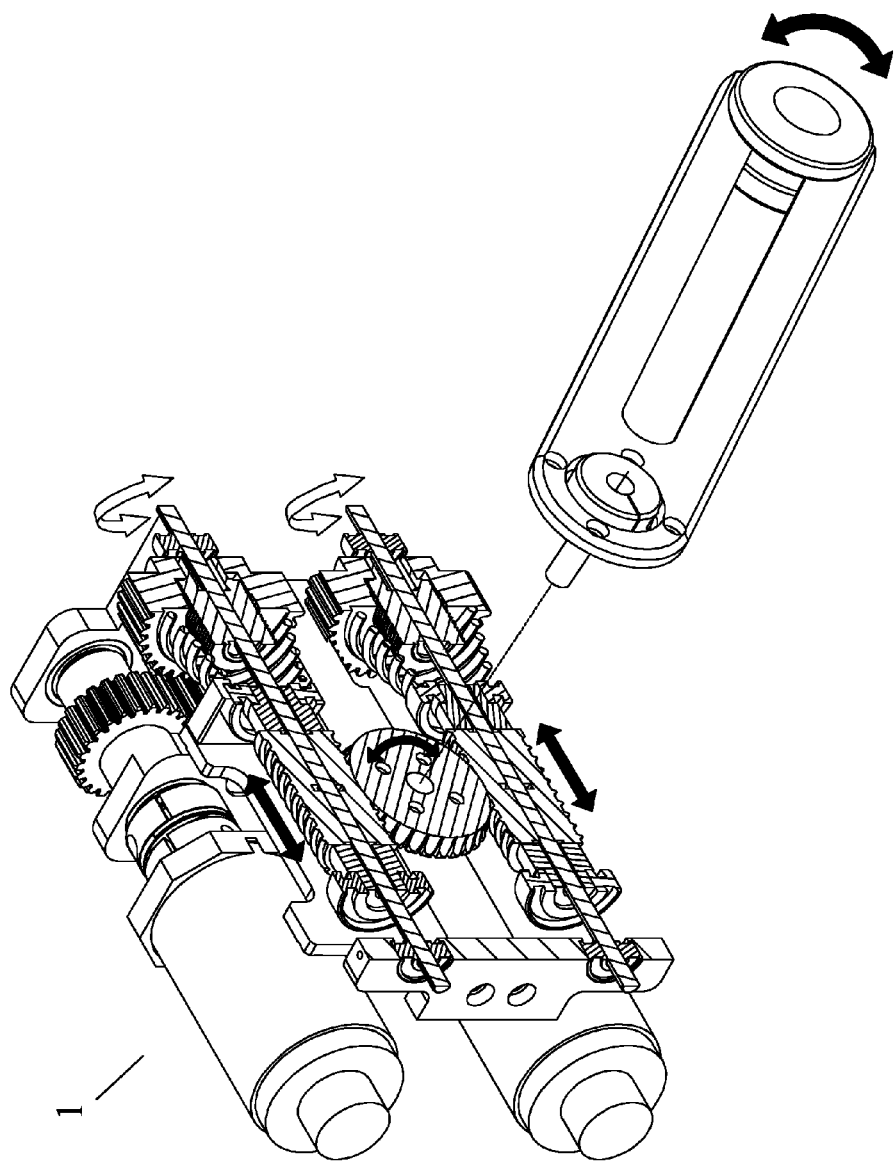
FIG. 10 is a third schematic view of an actuation system of the second preferred embodiment of the present invention.
Figure 11:
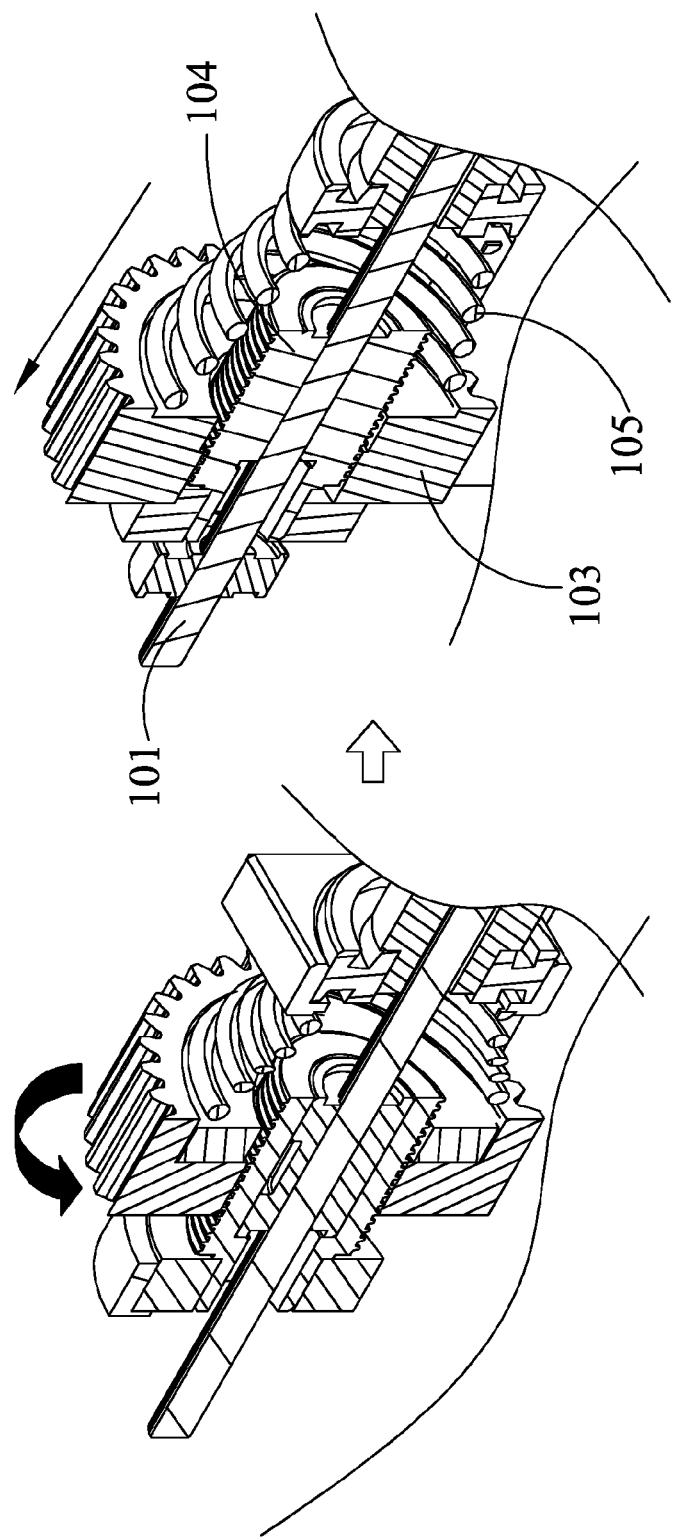
FIG. 11 is a fourth schematic view of an actuation system of the second preferred embodiment of the present invention.

With reference to FIGS. 10 and 11 for the third and fourth schematic views of an actuation system of the second preferred embodiment of the present invention respectively, the configuration and relation of the components of the actuation system 1 are the same as those described above, and thus will not be repeated. It is noteworthy that when the first actuation unit 61 and the second actuation unit 71 are controlled to rotate in different directions respectively (such as setting the first actuation unit 61 to rotate clockwise and the second actuation unit 71 to rotate counterclockwise), the rotation of the external arm 304 can be controlled. When the first actuation unit 61 and the second actuation unit 71 are rotated in the same direction (such as both in clockwise direction or both in counterclockwise direction), the first transmission part 102, the linking element 301 and the second transmission part 202 are latched with one another, so that the first adjusting element 104 and the second adjusting element 204 can adjust the rigidity by compressing or stretching the first elastic element 105 and the second elastic element 205 by the first actuation part 103 and the second actuation part 203.

Figure 12:
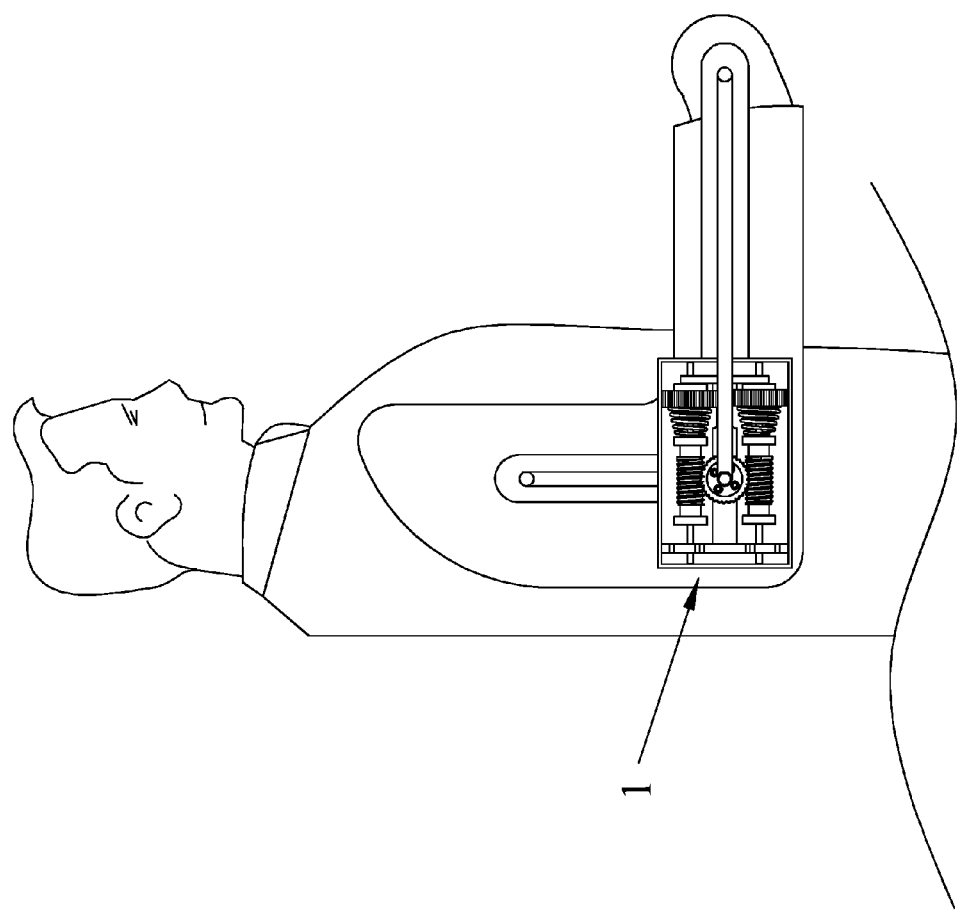
FIG. 12 is a fifth schematic view of an actuation system of the second preferred embodiment of the present invention.
Figure 13:
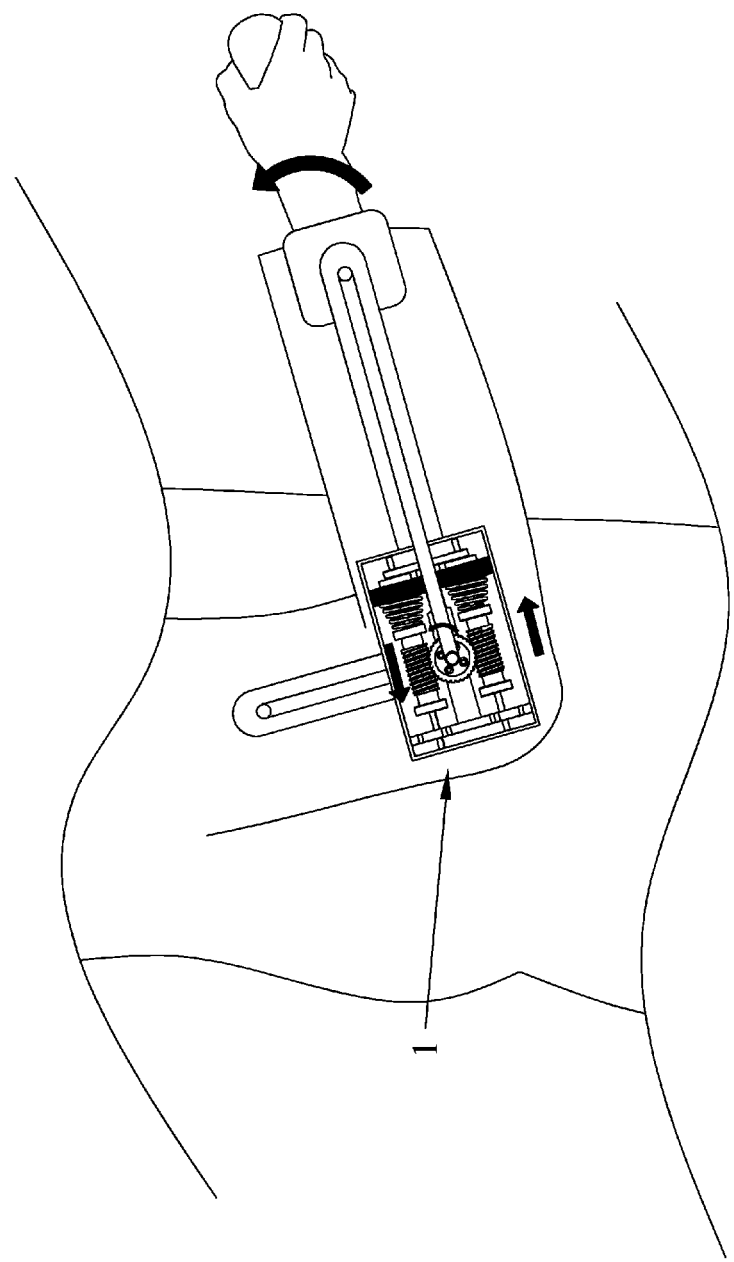
FIG. 13 is a sixth schematic view of an actuation system of the second preferred embodiment of the present invention.

With reference to FIGS. 12 and 13 for the fifth and sixth schematic views of an actuation system of the second preferred embodiment of the present invention respectively, the actuation system 1 can be applied in a mechanical arm. In the figures, a user can control the actuation module for the operation of the robotic arm, wherein the configuration and operation of related components have been described above and thus will not be repeated. When the mechanical arm is pushed by an external force, the external arm 304 drives the linking element 301 to rotate and further drives the first transmission part 102 and the second transmission part 202 to displace in an axial direction along the first transmission shaft 101 and the second transmission shaft 201. When the first transmission shaft 101 and the second transmission shaft 201 are displaced in the axial direction, the first elastic element 105 and the second elastic element 205 are stretched or compressed, so that the elastic resilience can be used to return the external arm 304 to its original position. More specifically, the first elastic element 105 and the second elastic element 205 are configured to provide elasticity similar to that of human arms to the mechanical arm.

In addition, this actuation system 1 can be applied in rehabilitation appliances, and rehabilitators can wear the actuation system 1 at their arm or leg. At an early stage of rehabilitation, the rehabilitators can use the actuation system 1 to drive an external arm 304 to assist them to lift their arm. At a later stage of rehabilitation, the rehabilitators can pull the external arm 304 or adjust the rigidity of each elastic element of the actuation system 1 by applying their own force according to the conditions of individual rehabilitators, so as to achieve the assisted rehabilitation effect.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:
1. An actuation system, comprising:
   a first transmission module, comprising:
      a first transmission shaft, being a rod structure;

a first transmission part, sheathed on the first transmission shaft, and an external surface of the first transmission part having a threaded structure;
a first actuation part, sheathed on a first adjusting element, and the first adjusting element being sheathed on the first transmission shaft; and
a first elastic element, sheathed on the first transmission shaft, and disposed between the first transmission part and the first actuation part;
a second transmission module, comprising:
a second transmission shaft, being a rod structure;
a second transmission part, sheathed on the second transmission shaft, and an external surface of the second transmission part having a threaded structure;
a second actuation part, sheathed on a second adjusting element, and the second adjusting element being sheathed on the second transmission shaft; and
a second elastic element, sheathed on the second transmission shaft, and disposed between the second transmission part and the second actuation part; and
a linking module, comprising:
a linking element, being a disc structure, pivotally installed to a frame and disposed between the first transmission part and the second transmission part, and having a serrated structure formed at an external periphery of the linking element and corresponding to the threaded structure, and the serrated structure being embedded into the threaded structures of the first transmission part and the second transmission part; and
an external arm, sheathed on a linking shaft, for coupling to the linking element,
wherein the first actuation part is driven to rotate in a first direction while the second actuation part is being driven to rotate in a second direction to drive the first transmission shaft and the second transmission shaft to rotate in the first direction and the second direction respectively, so that the first transmission part and the second transmission part are rotated in the first direction and the second direction respectively, and the linking element rotated to drive the external arm to rotate synchronously.

2. The actuation system of claim 1, wherein the first actuation part and the second actuation part are driven to rotate in a first direction or a second direction simultaneously to drive the first transmission shaft and the second transmission shaft to rotate in the first direction or the second direction, so that the first transmission part and the second transmission part are rotated in the first direction or the second direction simultaneously, and the linking element is not rotated.

3. The actuation system of claim 2, wherein when the first actuation part and the second actuation part are driven to rotate in the first direction or the second direction simultaneously, so that the linking element, the first transmission part, the second transmission part; the first transmission shaft and the second transmission shaft are not rotated, and when the first actuation part and the second actuation part are driven to rotate continuously, the first actuation part and the second actuation part are displaced in an axial direction through the first adjusting element and the second adjusting element to compress or stretch the first elastic element and the second elastic element respectively.

4. The actuation system of claim 1, wherein the first elastic element and the second elastic element are conical springs.

5. The actuation system of claim 1, wherein when the external arm is pushed by an external force, the linking element is linked to rotate, so that the first transmission part and the second transmission part are displaced in an axial direction along the first transmission shaft and the second transmission shaft respectively.

6. An actuation system, comprising:
a transmission module, comprising:
a first transmission shaft, being a rod structure;
a first transmission part, sheathed on the first transmission shaft, and an external surface of the first transmission part having a threaded structure;
a first actuation part, sheathed on a first adjusting element, and the first adjusting element being sheathed on the first transmission shaft;
a first elastic element, sheathed on the first transmission shaft, and disposed between the first transmission part and the first actuation part;
a second transmission shaft, being a rod structure;
a second transmission part, sheathed on the second transmission shaft, and an external surface of the second transmission part having a threaded structure;
a second actuation part, sheathed on a second adjusting element, and the second adjusting element being sheathed on the second transmission shaft;
a second elastic element, sheathed on the second transmission shaft, and disposed between the second transmission part and the second actuation part; and
a linking element, being a disc structure, pivotally installed to a frame and coupled to an external arm, and disposed between the first transmission part and the second transmission part, and an external periphery of the linking element being embedded with the threaded structure; and
an actuation module, comprising:
a first actuation unit, coupled to a first actuation gear set, and the first actuation gear set being embedded with the first actuation part; and
a second actuation unit, coupled to a second actuation gear set, and the second actuation gear set being embedded with the second actuation part,
wherein the first actuation part is driven to rotate in a first direction or a second direction, and the second actuation part is driven to rotate in the second direction or the first direction to drive the first transmission shaft and the second transmission shaft to rotate in the first direction and the second direction respectively, so that the first transmission part and the second transmission part are rotated in the first direction and the second direction respectively, and the linking element is rotated to drive the external arm to rotate synchronously.

7. The actuation system of claim 6, wherein the first actuation part and the second actuation part are driven to rotate in a first direction or a second direction simultaneously to drive the first transmission shaft and the second transmission shaft to rotate in the first direction or the second direction, so that the first transmission part and the second transmission part are rotated in the first direction or the second direction simultaneously, and the linking element is not rotated.

8. The actuation system of claim 7, wherein when the first actuation part and the second actuation part are driven to rotate in the first direction or the second direction simultaneously, so that the linking element, the first transmission part, the second transmission part, the first transmission shaft and the second transmission shaft are not rotated, and when the first actuation part and the second actuation part are driven to rotate continuously, the first actuation part and the second actuation part are displaced in an axial direction through the first adjusting element and the second adjusting element to compress or stretch the first elastic element and the second elastic element respectively.

9. The actuation system of claim 6, wherein the first elastic element and the second elastic element are conical springs.

10. The actuation system of claim 6, wherein when the external arm is pushed by an external force, the linking element is linked to rotate, so that the first transmission part and the second transmission part are displaced in an axial direction along the first transmission shaft and the second transmission shaft respectively.

\* \* \* \* \*